(12) United States Patent
Iwasaki et al.

(10) Patent No.: US 11,561,566 B2
(45) Date of Patent: Jan. 24, 2023

(54) ACCELERATOR PEDAL DEVICE FOR VEHICLE

(71) Applicant: HONDA MOTOR CO., LTD., Tokyo (JP)

(72) Inventors: Hiroyuki Iwasaki, Wako (JP); Ayumu Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 422 days.

(21) Appl. No.: 16/821,740

(22) Filed: Mar. 17, 2020

(65) Prior Publication Data
US 2020/0310484 A1 Oct. 1, 2020

(30) Foreign Application Priority Data

Mar. 25, 2019 (JP) .............................. JP2019-056153

(51) Int. Cl.
  *G05G 5/03* (2008.04)
  *G05G 5/05* (2006.01)
  *G05G 1/44* (2008.04)
  *B60K 26/02* (2006.01)

(52) U.S. Cl.
  CPC ............. *G05G 5/03* (2013.01); *B60K 26/021* (2013.01); *G05G 1/44* (2013.01); *G05G 5/05* (2013.01); *G05G 2505/00* (2013.01)

(58) Field of Classification Search
  CPC .......... B60K 26/021; G05G 5/03; G05G 1/44; G05G 5/05; G05G 2505/00
  See application file for complete search history.

(56) References Cited

U.S. PATENT DOCUMENTS

| | | | |
|---|---|---|---|
| 5,934,152 A | 8/1999 | Aschoff et al. |
| 6,289,762 B1 | 9/2001 | Silva |
| 6,360,631 B1 | 3/2002 | Wortmann et al. |
| 2004/0237700 A1 | 12/2004 | Wurn |
| 2007/0137395 A1 | 6/2007 | Ypma |

(Continued)

FOREIGN PATENT DOCUMENTS

| | | |
|---|---|---|
| JP | S59-88534 U | 6/1984 |
| JP | H05-83482 U | 11/1993 |

(Continued)

OTHER PUBLICATIONS

Office Action received in corresponding Japanese application No. 2019-056153 dated Feb. 9, 2021 with English translation (6 pages).

*Primary Examiner* — Jeremy R Severson
(74) *Attorney, Agent, or Firm* — Rankin, Hill & Clark LLP (57) ABSTRACT

An accelerator pedal device for use in a vehicle has: a housing fixed to a vehicle body; an accelerator arm that has a drum at one end and a pedal at the other end; a friction pad that has a pad shaft; and a spring that is interposed between the accelerator arm and the friction pad. The drum has an arm pivoting shaft that pivotally supports the accelerator arm and a recess that is recessed from a periphery of the drum toward the arm pivoting shaft, the friction pad has a friction part that is pressed against the recess by a spring force of the spring, the friction part has a side surface member having a side surface in an arched cross section to face the recess, and the side surface member has a contact part that is brought into point-contact with the recess of the drum.

4 Claims, 13 Drawing Sheets

(56) References Cited

U.S. PATENT DOCUMENTS

| | | |
|---|---|---|
| 2007/0137400 A1 | 6/2007 | Campbell |
| 2009/0007717 A1 | 1/2009 | Wurn |
| 2010/0077886 A1 | 4/2010 | Seiltz et al. |
| 2011/0162481 A1 | 7/2011 | Campbell |
| 2012/0031221 A1 | 2/2012 | Campbell |
| 2020/0073431 A1* | 3/2020 | Byrd ........................ G05G 5/03 |

FOREIGN PATENT DOCUMENTS

| | | |
|---|---|---|
| JP | 2005-271826 A | 10/2005 |
| JP | 2007-504056 A | 3/2007 |
| JP | 2009-514125 A | 4/2009 |
| JP | 2009-525537 A | 7/2009 |
| JP | 2011-005929 A | 1/2011 |
| JP | 2012-157332 A | 8/2012 |
| JP | 2014-170456 A | 9/2014 |
| JP | 5789656 B2 | 10/2015 |
| KR | 20080047742 A | 5/2008 |

* cited by examiner

COMPARATIVE EXAMPLE

ACCELERATOR PEDAL DEVICE FOR VEHICLE

CROSS-REFERENCE TO RELATED APPLICATION

This application is based upon and claims priority from the Japanese Patent Application No. 2019-056153, filed on Mar. 25, 2019, the entire contents of which are incorporated herein by reference.

BACKGROUND OF THE INVENTION

Field of the Invention

The present invention relates to an accelerator pedal device for use in a vehicle that controls a power unit.

Description of the Related Art

For example, in a vehicle, a frictional force is generated between a friction pad and a drum by a pedal force through an accelerator pedal. In JP5789656, a hysteresis structure is used that gives hysteresis to an operation load characteristic of the accelerator pedal, based on a difference in frictional direction (frictional force) at the time of pedaling and returning the accelerator pedal.

Generally, giving to the operation load characteristic of the accelerator pedal allows a driver to hold the accelerator pedal in an arbitrary pedal position, to reduce fatigue of the driver.

Dimensional errors (individual variations) due to manufacturing errors of respective parts or mounting errors (mounting variation) due to assembling errors may occur at the time of manufacturing. Conventionally, a contact portion of the friction pad is brought in surface-contact with a contact portion of the drum. When the contact portions are brought in surface-contact, a contact position between the friction pad and the drum may vary due to dimensional errors or mounting errors, which may vary the pedal force through the accelerator pedal.

In other words, if the contact position between the friction pad and the drum varies due to various errors (variations), the operation load characteristic of the accelerator pedal varies, causing the pedal force through the accelerator pedal to vary and to be unstable.

SUMMARY OF THE INVENTION

The present invention has been made in view of the above the problem to provide an accelerator pedal device that can stabilize a pedal force through an accelerator pedal, even if there are various variations such as dimensional errors and mounting errors.

To solve the problem, the present invention provides an accelerator pedal device for use in a vehicle, having: a housing fixed to a vehicle body; an accelerator arm that has a drum at one end and a pedal at the other end in an axial direction, and is attached to the housing so as to be pivotable between an idling position and a full throttle position; a friction pad that has a pad shaft and is attached to the housing so as to be pivotable about the pad shaft; and a spring that is interposed between the accelerator arm and the friction pad; wherein the drum has an arm pivoting shaft that pivotally supports the accelerator arm and a recess that is recessed from a periphery of the drum toward the arm pivoting shaft; the friction pad has a friction part that is pressed against the recess by a spring force of the spring; the friction part has a side surface member having a side surface in an arched cross section to face the recess, and the side surface member has a contact part that is brought into point-contact with the recess of the drum.

Further, the present invention provides an accelerator pedal device for use in a vehicle, having: a housing fixed to a vehicle body; an accelerator arm that has a drum at one end and a pedal at the other end in an axial direction, and is attached to the housing so as to be pivotable between an idling position and a full throttle position; a friction pad that has a pad shaft and is attached to the housing so as to be pivotable about the pad shaft; a spring that is interposed between the accelerator arm and the friction pad; wherein the drum has an arm pivoting shaft that pivotally supports the accelerator arm and a recess that is recessed from a periphery of the drum toward the arm pivoting shaft; the friction pad has a friction part that is pressed against the recess by a spring force of the spring; the friction part has a side surface member having a side surface to face the recess, the side surface member has a ridge part that is brought into line-contact with the recess of the drum, and the ridge part is formed in an arc shape centered around the arm pivoting shaft.

Furthermore, the present invention provides an accelerator pedal device for use in a vehicle, including: a housing fixed to a vehicle body; an accelerator arm that has a drum at one end and a pedal at the other end in an axial direction, and is attached to the housing so as to be pivotable between an idling position and a full throttle position; a friction pad that has a pad shaft and is attached to the housing so as to be pivotable about the pad shaft; a spring that is interposed between the accelerator arm and the friction pad; wherein the drum has an arm pivoting shaft that pivotally supports the accelerator arm and a recess that is recessed from a periphery of the drum toward the arm pivoting shaft; the friction pad has a friction part that is pressed against the recess by a spring force of the spring; the friction part has a side surface member having a side surface to face the recess, the side surface member has a ridge part that is brought into line-contact with the recess of the drum, and the ridge part is formed in such a manner that a ratio (R/A) between a radius R of a circle having a drum rotation shaft as its center and a distance A from the rotation shaft of the friction pad to the ridge part is set to be constant.

The invention provides an accelerator pedal device that can stabilize a pedal force through an accelerator pedal, even if there are various variations such as dimensional errors and mounting errors.

DETAILED DESCRIPTION OF THE PREFERRED EMBODIMENTS

A description will be given of embodiments of the present invention in detail with reference to the drawings as appropriate.

Figure 1:
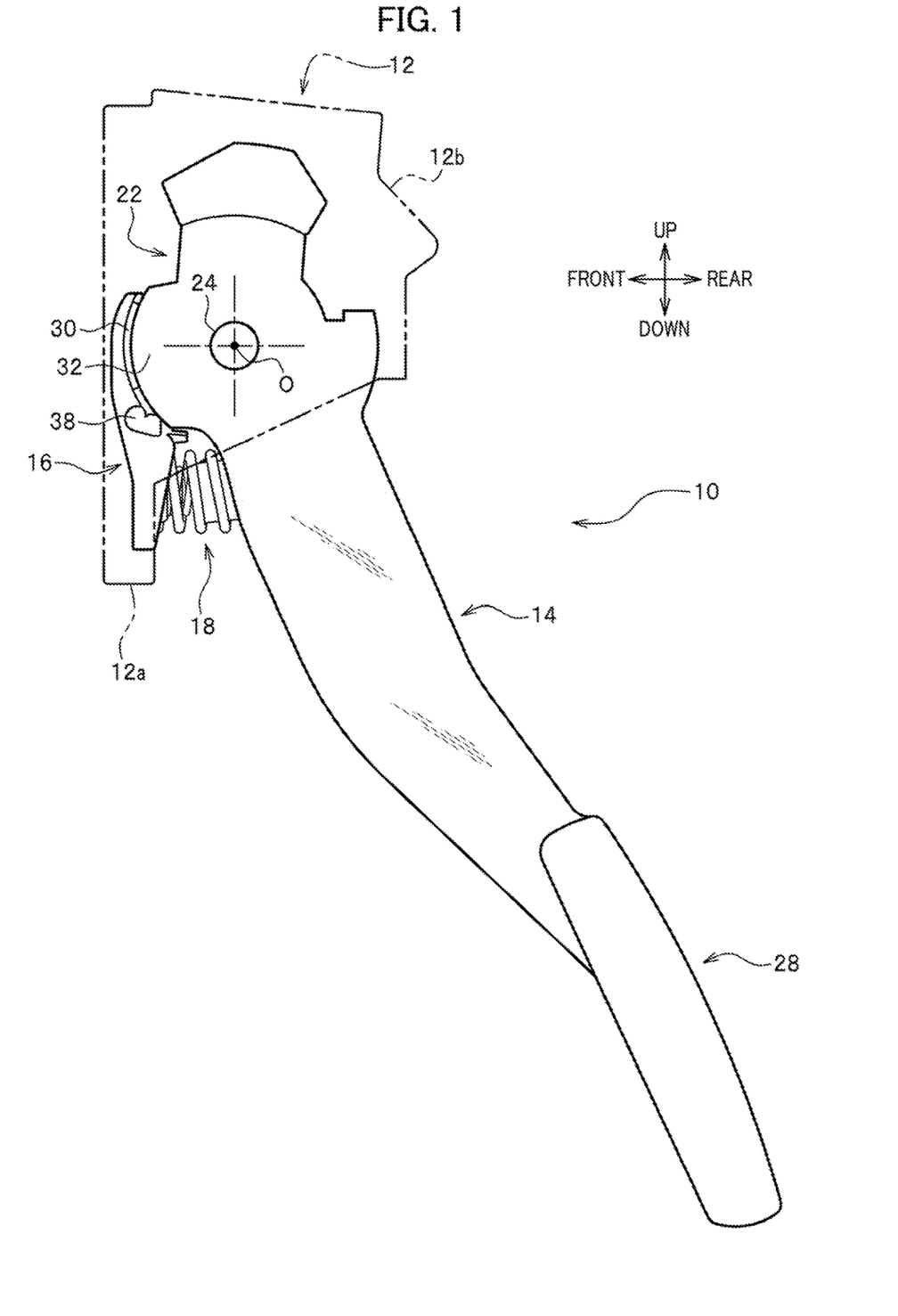
FIG. 1 is a schematic side view of an accelerator pedal device for use in a vehicle according to an embodiment of the present invention.
Figure 2:
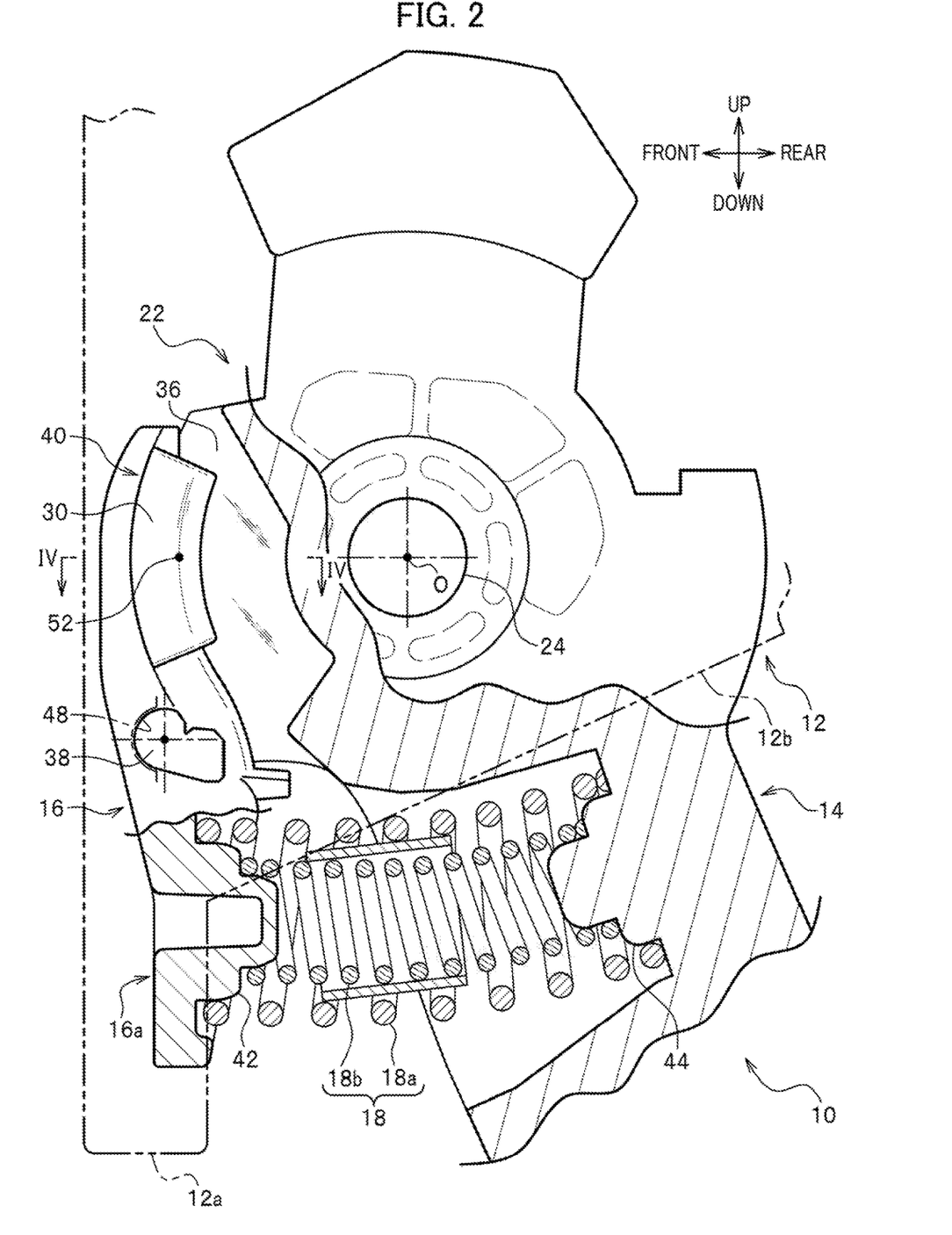
FIG. 2 is an enlarged side view of a housing and a friction pad of which a portion is shown in cross-section in FIG. 1.
Figure 3:
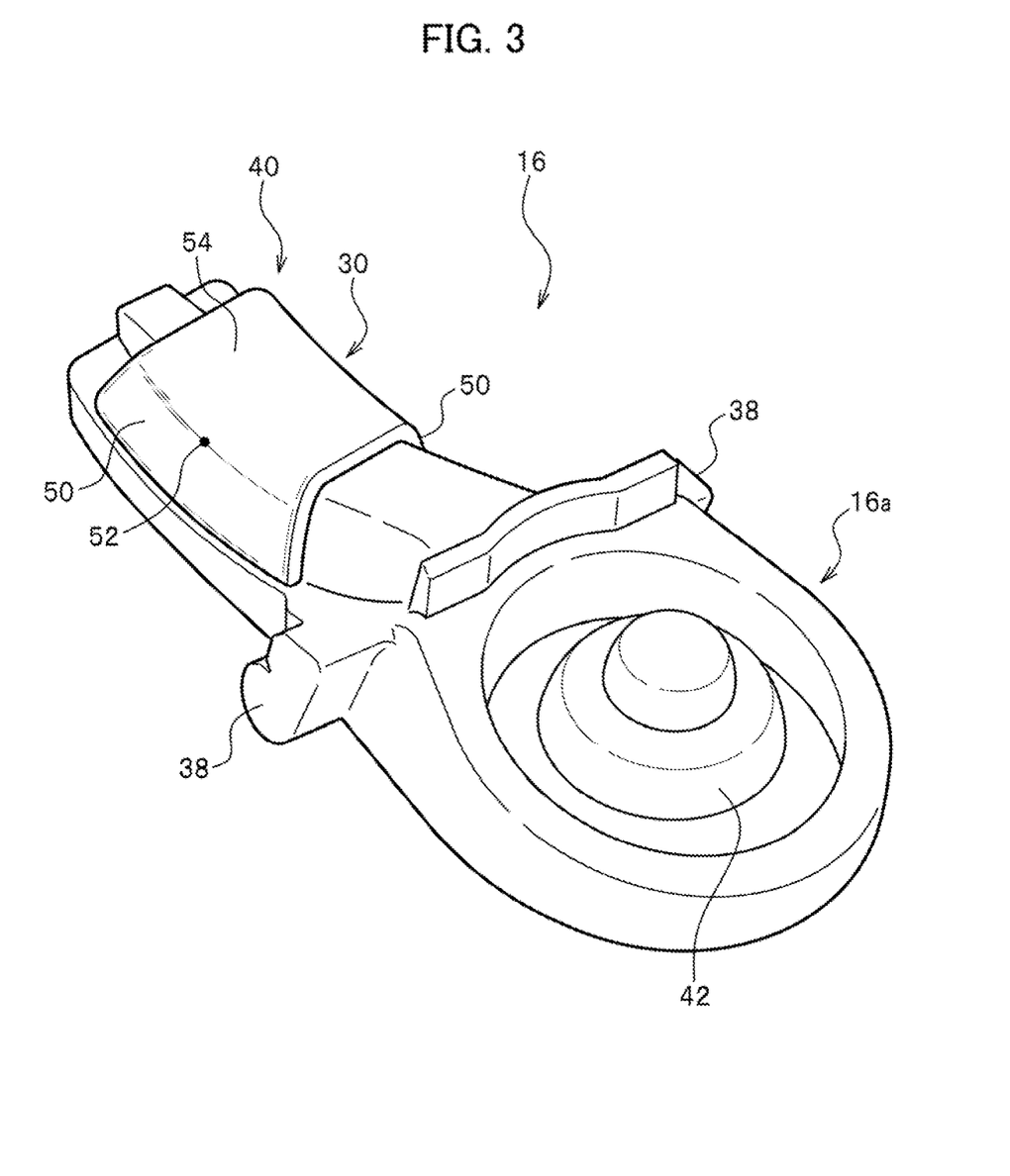
FIG. 3 is an enlarged perspective view of the friction pad.

FIG. 1 is a schematic side view of an accelerator pedal device for use in a vehicle according to an embodiment of the present invention, FIG. 2 is an enlarged side view of a housing and a friction pad of which a portion is shown in cross-section in FIG. 1, and FIG. 3 is a an enlarged perspective view of the friction pad. Note that, in the drawings, "front to rear" indicates a longitudinal direction of a vehicle, "left to right" indicates a lateral direction (vehicle width direction), and "top to bottom" indicates a vertical direction of the vehicle.

As shown in FIG. 1, an accelerator pedal device 10 for use in a vehicle according to an embodiment of the present invention has a housing 12, an accelerator arm 14, a friction pad 16, and a spring member 18.

The housing 12 has a base portion 12a and a casing 12b consecutively connected to the rear side of the base portion 12a. Bolt attachment holes (not shown) are formed in the base portion 12a. The housing 12 (the base portion 12a) is fixed to a vehicle body (not shown) by bolts (not shown) inserted in the bolt attachment holes. A space for accommodating a drum 22 (see FIGS. 1 and 2) to be described later is defined in the casing 12b.

An arm rotation shaft 24 fixed to the drum 22 is disposed in the space of the casing portion 12b so as to penetrate the left and right side walls of the housing 12. Bearing holes (not shown) for axially supporting the arm rotation shaft 24 are provided in the left and right side walls of the housing 12, respectively.

As shown in FIG. 1, the accelerator arm 14 is disposed on the vehicle lower side of the housing 12. The drum 22 is disposed at one end (upper end) of the accelerator arm 14 along the axial direction, and a pedal 28 is disposed at the other end (lower end) along the axial direction. Further, the accelerator arm 14 is attached to the housing 12 to be rotatable between an idling position and a full throttle position about the arm rotation shaft 24 as a pivot point.

The drum 22 is accommodated in the space of the casing 12b and is in a relatively thick disk-shape having a large diameter. The arm rotation shaft 24 is disposed at the center of the drum 22 to rotatably support the accelerator arm 14. In each drawing, a point O indicates the center of the arm rotation shaft 24.

Figure 4:
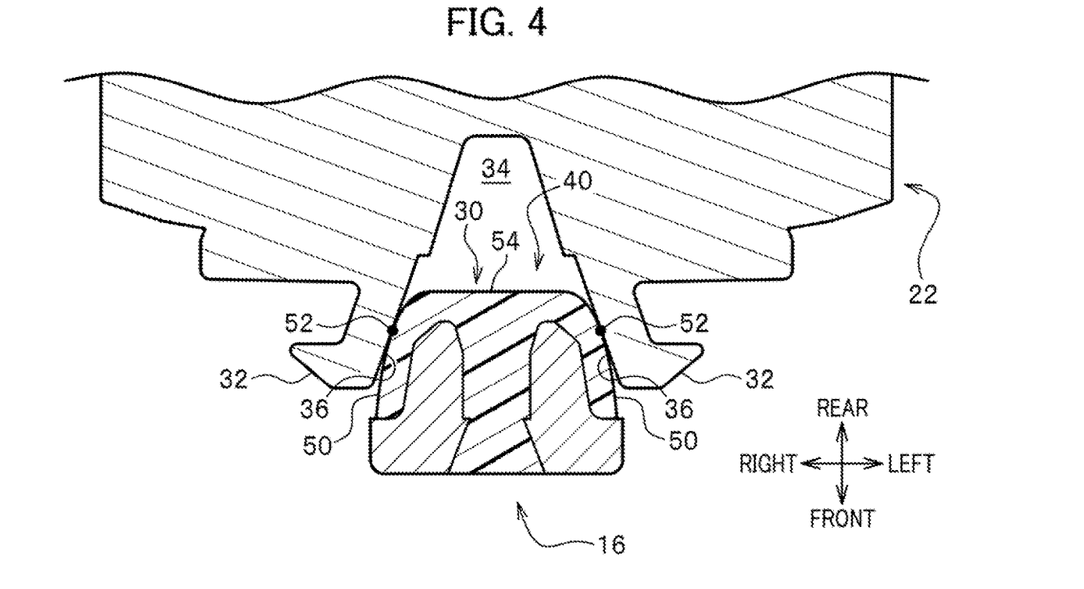
FIG. 4 is a vertical cross-sectional view taken along a IV-IV line in FIG. 2, showing that a contact portion of a side member is brought in point-contact with a recessed inner wall of the drum.

FIG. 4 is a vertical cross-sectional view taken along a IV-IV line in FIG. 2, showing that a contact portion of a side member is brought in contact with an recessed inner wall of the drum.

A forked portion 32 in an arc-shape (see FIG. 4) is disposed at the front side of the drum 22, to sandwich the side member 30 from both sides. The forked portion 32 extends in a substantially arc-shape as viewed from the side and is forked so as to extend substantially in parallel. As shown in FIG. 4, a recessed portion 34 that is recessed from the outer periphery toward the arm rotation shaft 24 is formed in a space between the branched portions of the forked portion 32. The recessed portion 34 is formed in an inverted V-shaped cross section by two recessed inner walls 36, 36 as flat surfaces.

Returning to FIG. 1, the friction pad 16 is disposed between the drum 22 of the accelerator arm 14 and the base 12a of the housing 12. The friction pad 16 has a pad main body 16a in a disk shape in planar view, a pad shaft portion 38, and a friction portion 40.

As shown in FIG. 3, the pad shaft portion 38 is formed between the pad main body 16a and the friction portion 40 as a pair of protrusions that protrudes in a direction substantially perpendicular to the axis of the friction pad 16. The pad shaft portion 38 is rotatably supported by a bearing 48 formed in the base 12a. The friction pad 16 is rotatably attached to the housing 12 about the pad shaft portion 38 as a rotation center.

As shown in the spring member 18 is interposed between the accelerator arm 14 and the friction pad 16. The spring member 18 includes an outer diameter coil spring 18a disposed on the outer diameter side and an inner diameter coil spring 18b disposed on the inner diameter side. One end of the spring member 18 is engaged with a receiving seat 42 disposed on the pad main body 16a. The other end of the spring member 18 is engaged with a spring receiving seat 44 disposed on the accelerator arm 14. The friction portion 40 (see FIG. 3) of the friction pad 16 is disposed to be pressed against the recessed portion 34 of the drum 22 by a spring force of the spring member 18.

Figure 5:
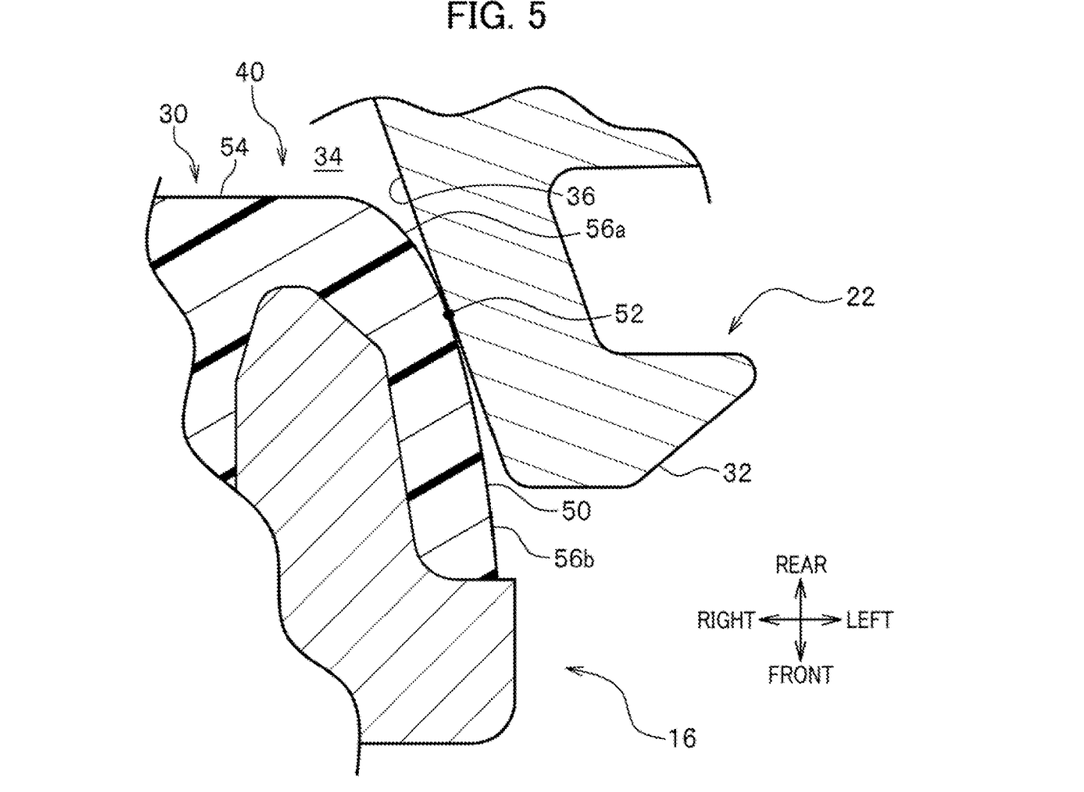
FIG. 5 is an enlarged vertical cross-sectional view of the contact portion shown in FIG. 4.
Figure 6:
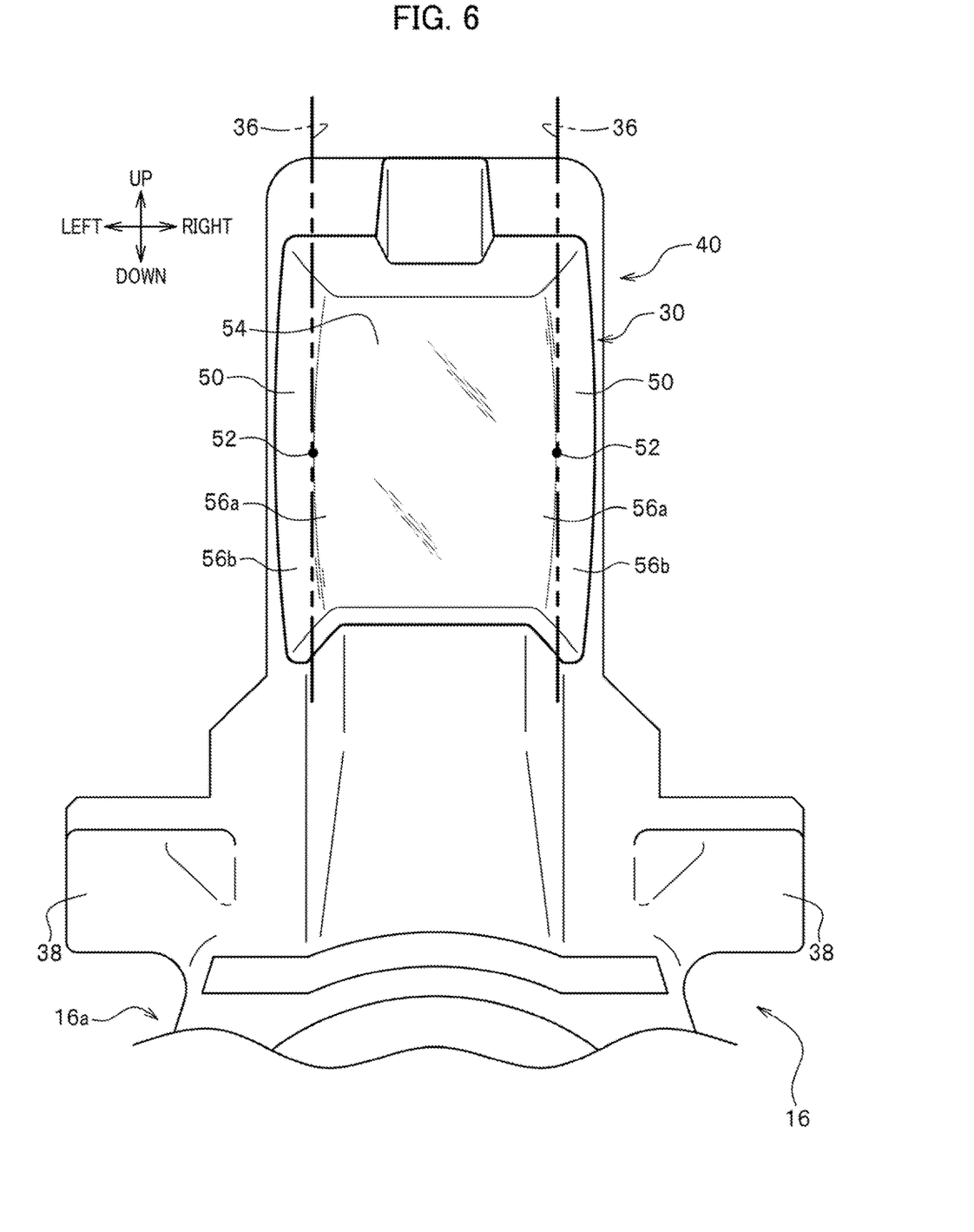
FIG. 6 is an enlarged plan view of the side member.

FIG. 5 is an enlarged vertical sectional view of the contact portion shown in FIG. 4, and FIG. 6 is an enlarged plan view of the side member.

The side member 30 having right and left side surfaces 50, 50 that face the recessed portion 34 is disposed at the rear side of the friction portion 40. As shown in FIGS. 4 and 5, the left and right side surfaces 50, 50 of the side member 30 includes the contact portions (contact points) 52 to be brought in point-contact with the recessed inner walls 36, 36 formed by the flat surfaces of the drum 22. The left and right side surfaces 50, 50 are respectively formed continuously on both sides of a rear surface 54 of the side member 30.

Each side surface 50 includes a vertical arc-shaped surface 56a (see FIG. 6) formed to be in an arc shape in a vehicle front view and a horizontal arc-shaped surface 56b (see FIG. 5) formed to be in a arc shape in axial cross-sectional view. The contact portion 52 is formed to be brought in point-contact with the recessed inner wall 36 as a flat surface of the drum 22 at a portion where the vertical arc-shaped surface 56a intersects the horizontal arc-shaped surface 56b.

The radius of curvature of the vertical arc-shaped surface 56a and the curvature radius of the arc-shaped surface 56b may be the same or different. If the radius of curvature of the vertical arc-shaped surface 56a is the same as the radius of curvature of the horizontal arc-shaped surface 56b, the portion is a spherical surface.

In the present embodiment, the contact portions 52 that are brought in point-contact are formed on the friction portion 40 of the friction pad 16, but the present invention is not limited thereto. For example, the contact portions 52 that are brought in point-contact may be formed on the recessed portion 34 of the drum 22.

The accelerator pedal device 10 for use in a vehicle according to the present embodiment is basically configured as described above. Next, operations and effects thereof will be described.

When a driver steps on the pedal 28, a pedal force is applied to the accelerator arm 14. The accelerator arm 14 is rotated by a predetermined angle toward the vehicle body side (not shown) about the arm rotation shaft 24 as the center of rotation by the pedal force. The pivoting motion of the accelerator arm 14 compresses the spring member 18 (18a, 18b), and the friction pad 16 is rotated about the pad shaft portion 38 as a rotation center by the spring force (compressive force). The pivoting motion of the friction pad 16 presses the friction portion 40 against the recessed portion 34 of the drum 22.

When the friction portion 40 is pressed against the recessed portion 34 of the drum 22, the contact portion 52 formed on the side member 30 of the friction portion 40 is brought in point-contact with the recessed inner wall 36 as a flat surface of the recessed portion 34 of the drum 22.

When the driver stops stepping on the pedal 28 to return, the pedal force on the pedal 28 is released. The accelerator arm 14 is rotated by the spring force (extension force) of the spring member 18 such that the friction pad 16 is rotated about the pad shaft portion 38 to separate the contact portion 52 formed on the side surface 30 away from the recessed inner wall 36 of the drum 22. Thus, the friction pad 16 and the accelerator arm 14 return to initial positions.

Next, a description will be given of the operations and effects of the present embodiment below by comparing the present invention with a comparative example proposed by the applicant. Note that, in the comparative example, the same reference numerals are denoted to the same elements as those in the present embodiment.

Figure 16:
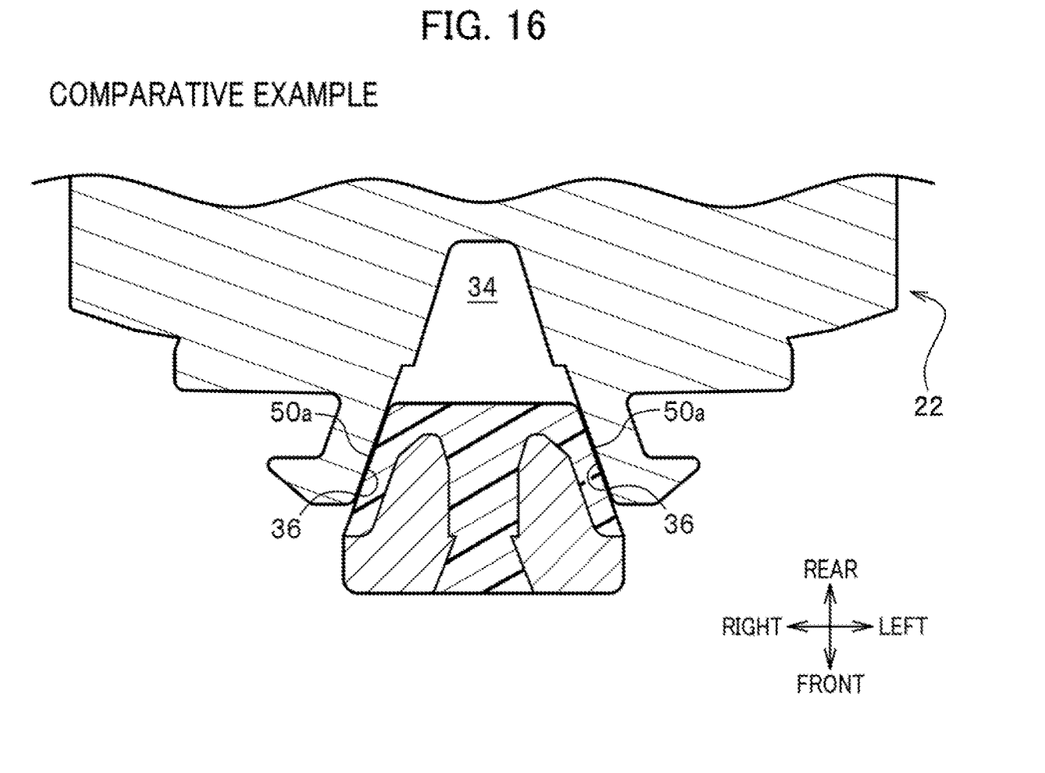
FIG. 16 is a vertical cross-sectional view of a friction pad according to a comparative example.

FIG. 16 is an enlarged vertical cross-sectional view of an accelerator pedal device for use in a vehicle according to a comparative example proposed by the applicant. In the comparative example shown in FIG. 16, portions corresponding to the contact portions 52 are not provided. The comparative example differs from the the present embodiment in that the recessed inner walls 36 of the drum 22 are brought in surface-contact with side surfaces 50a of the side member 30 as flat surfaces.

In the comparative example shown in FIG. 16, since each side surface 50a of the side member 30 in the friction portion 40 is brought in contact with each recessed inner wall 36 of the drum 22, for example, if various variations are included such as dimensional errors and mounting errors, the contact position may vary. This changes the operation load characteristic of the accelerator arm 14, and the pedal force varies.

On the other hand, in the present embodiment, the contact portion 52 that is brought in point-contact with the recessed inner wall 36 (flat surface) of the recessed portion 34 of the drum portion 22 is formed on each side surface 50 of the side member 30 (see FIG. 5). Thus, in the present embodiment, the contact portion 52 is always brought in contact with the recessed inner wall of the recessed portion 34 of the drum 22, which avoids the variation of the contact position. Accordingly, in the present embodiment, even if there are various variations such as dimensional errors and mounting errors, the pedal force through the accelerator arm 14 is stabilized.

Figure 7:
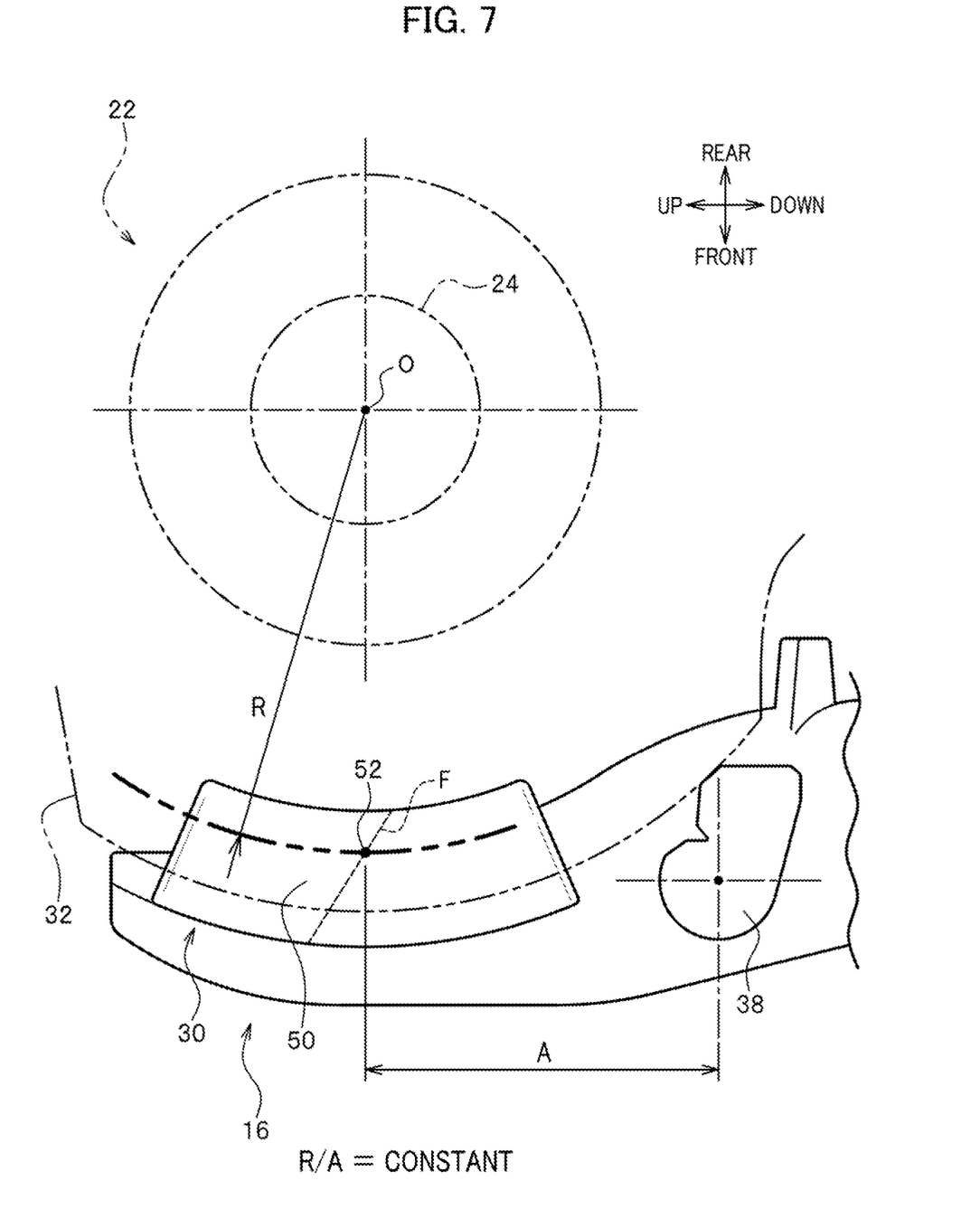
FIG. 7 is an explanatory view showing a relationship between a radius R from the center of an arm rotation shaft to the contact portion and a distance A from the contact portion to a pad rotation shaft.

In the present embodiment, the contact portion 52 between the friction portion 40 and the recessed portion 34 is positioned in such a manner that a ratio (R/A) between the radius R having a drum rotation shaft as a center and a distance A from the rotation shaft of the friction pad 16 to the contact portion 52 is set to be constant. Specifically, as shown in FIG. 7, the radius R refers to a radius having the arm rotation shaft 24 (drum rotation shaft) as a center passing through the contact portion 52 as viewed in the axial direction of the arm rotation shaft 24. The distance A refers to a distance between the pad shaft portion 38 of the friction pad 16 and the contact portion 52 as viewed in the axial direction of the arm rotation shaft 24. In the present embodiment, setting the ratio (R/A) between the radius R and the distance A constant allows the frictional force applied to the pedal 28 constant even when various variations are taken into consideration, and the pedal force is stabilized. It is to be noted that the dashed line F indicates positions of the contact points (the contact portion 52) of which ratio (R/A) is constant.

Further, in the present embodiment, the receiving seat 42 is provided for receiving an end the spring member 18 in the pad main body 16a in an opposite side of the friction portion 40 with respect to the pad shaft portion 38. The spring member 18 serves to return the accelerator arm 14 to the idling position and also to press the friction pad 16 against the recessed portion 34 of the drum 22. Hysteresis is generated in the pedal force by the spring member 18 and the friction pad 16. More specifically, as shown in FIGS. 2 and 3, in the present embodiment, the receiving seat 42 is formed for engaging the spring member 18 in the pad main body 16a at an opposite side of the friction portion 40 along the axial direction with respect to the pad shaft portion 38. The spring member 18 serves to press the friction pad 16 against the recessed portion 34 of the drum 22 and to return the accelerator arm 14 to the idling position. When the pedal 28 is stepped on, a large pressing force is applied, and when the pedal 28 is released, a smaller pressing force is applied than at the time of stepped on. Hysteresis H is generated in the pedal force by the spring member 18 and the friction pad 16 (see FIG. 8).

Figure 8:
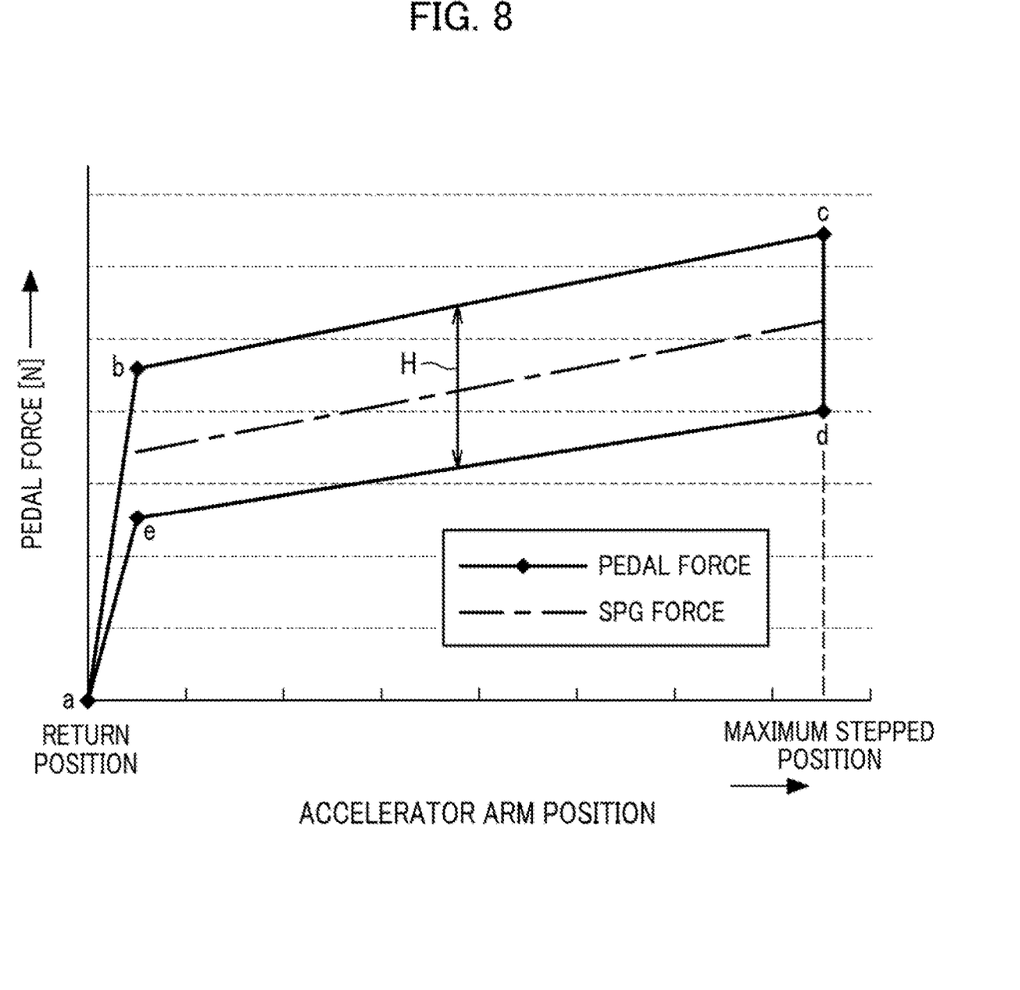
FIG. 8 is a graph showing an operation load characteristic of the accelerator pedal device for use in a vehicle according to the present embodiment.

FIG. 8 is a graph showing an operation load characteristic of the accelerator pedal device for use in a vehicle according to the present embodiment. The pedal operating load rises sharply as indicated by the line a-b in FIG. 8. Subsequently, the operation load of the accelerator arm 14 increases as indicated by the line b-c in FIG. 8. Further, the return operation load of the accelerator arm 14 decreases abruptly as indicated by the line c-d in FIG. 8, then decreases as indicated by the line d-e in FIG. 8 and returns to the initial position (return position). In FIG. 8, the one-dot chain line shows the spring load of the spring member 18.

In the present embodiment, with the hysteresis H as shown in FIG. 8, the holding force for the pedal 28 by the driver is relatively reduced to improve the operability of the accelerator arm 14.

Figure 9:
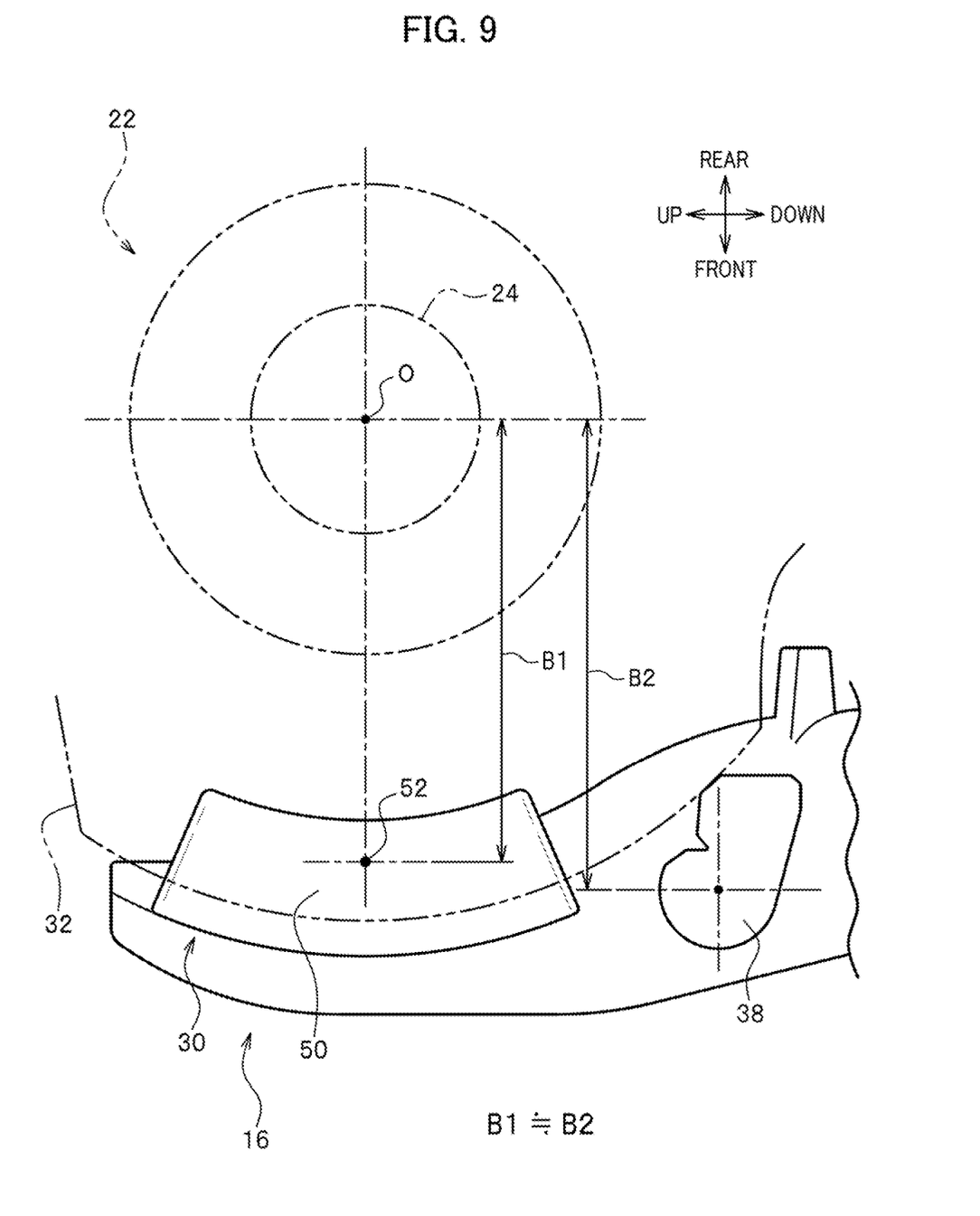
FIG. 9 is an explanatory view showing a relationship between a distance B1 from the center of the arm rotation shaft to the contact portion and a distance B2 from the arm rotation shaft to the pad rotation shaft.

As shown in FIG. 9, in the present embodiment, furthermore, a distance B1 from the contact portion 52 of the friction portion 40 to the arm rotation shaft 24 is set nearly equal as a distance B2 from the arm rotation shaft 24 to the pad shaft portion 38, as viewed from the axial direction of the arm rotation shaft 24. Accordingly, in the present embodiment, a partial variation in the contact surface pressure between the recessed portion 34 of the drum 22 and the contact portion 52 of the friction portion 40 is reduced to achieve stabilization of the pedal force.

Furthermore, in the present embodiment, the friction portion 40 is made of a different resin material from other portions of the friction pad 16. More specifically, the side member 30 of the friction portion 40 is made of a different resin material from other portions of the friction pad 16. The pad main body 16a of the frictional pad 16 is made, for example, of Polyphthalamide (PPA) resin including a glass fiber in the ratio of 45%. The side member 30 of the friction portion 40 is made, for example, of polyacetal (POM) resin.

In the present embodiment, using a resin material having wear resistance only for the side member 30 of the friction portion 40 achieves both necessary rigidity, strength and durability of the friction pad 16.

Further, in the present embodiment, the friction portion 40 has a substantially M-shaped cross-section and extends in a direction substantially perpendicular to the pad shaft portion 38. Specifically, as shown in FIG. 4, the friction portion 40 has a substantially M-shaped cross-section and extends in a direction substantially perpendicular to the pad shaft portion 38. In the present embodiment, forming the friction portion 40 in a substantially M-shaped cross section prevents a positional deviation from the pad main body 16a of the frictional pad 16, to contribute to stabilization of the pedal force.

Figure 10:
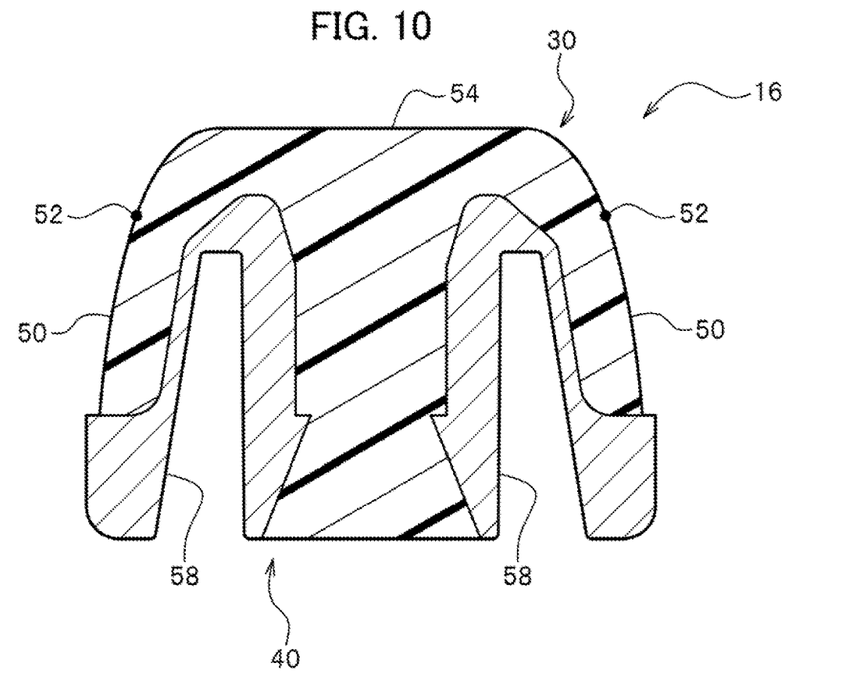
FIG. 10 is an enlarged cross-sectional view of a friction portion having a lightened portion of the friction pad.

As shown in FIG. 10, in the present embodiment, the lightened portion 58 is provided on the back surface of the friction portion 40. Accordingly, in the present embodiment, appropriately reducing the rigidity and strength of the friction portion 40 reduces the stick slip to contribute to the stabilization of the pedal force.

Figure 11:
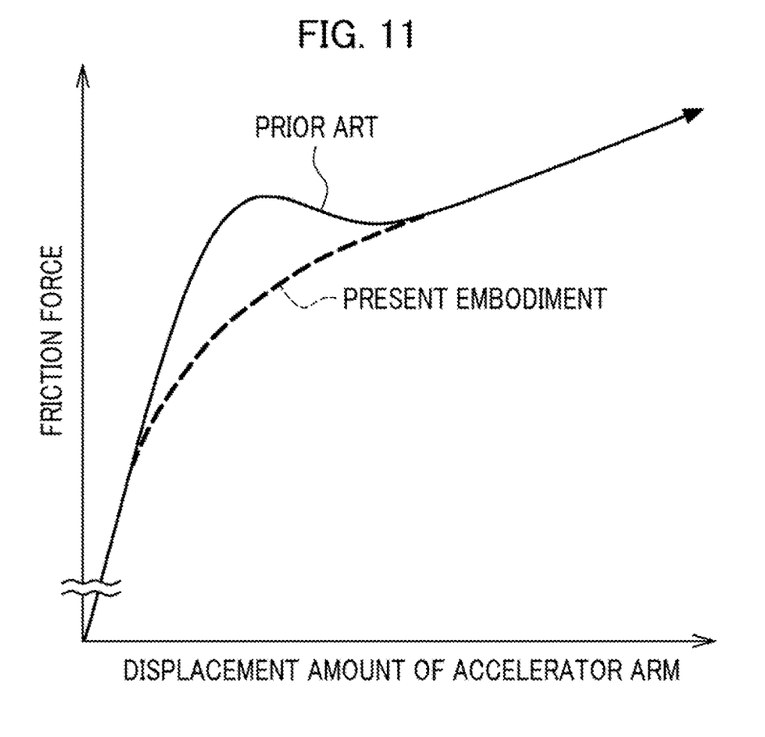
FIG. 11 is a graph showing a relationship between a displacement amount of an accelerator arm and a frictional force.

FIG. 11 is a characteristic graph showing the relationship between the displacement amount of the accelerator arm and the frictional force. In the present embodiment, appropriately reducing the rigidity and strength of the friction portion 40 reduces the frictional force to that shown by the broken line in FIG. 11, to reduce the stick slip. Note that, in FIG. 11, the solid line indicates the characteristic curve of the conventional technique.

Next, a description will be given of an accelerator pedal device 100 for use in a vehicle according to another embodiment of the present invention below. Note that the same reference numerals are denoted to the same elements as those in the above-described embodiment shown in FIGS. 1 to 6, and a detailed description thereof will be omitted.

Figure 12:
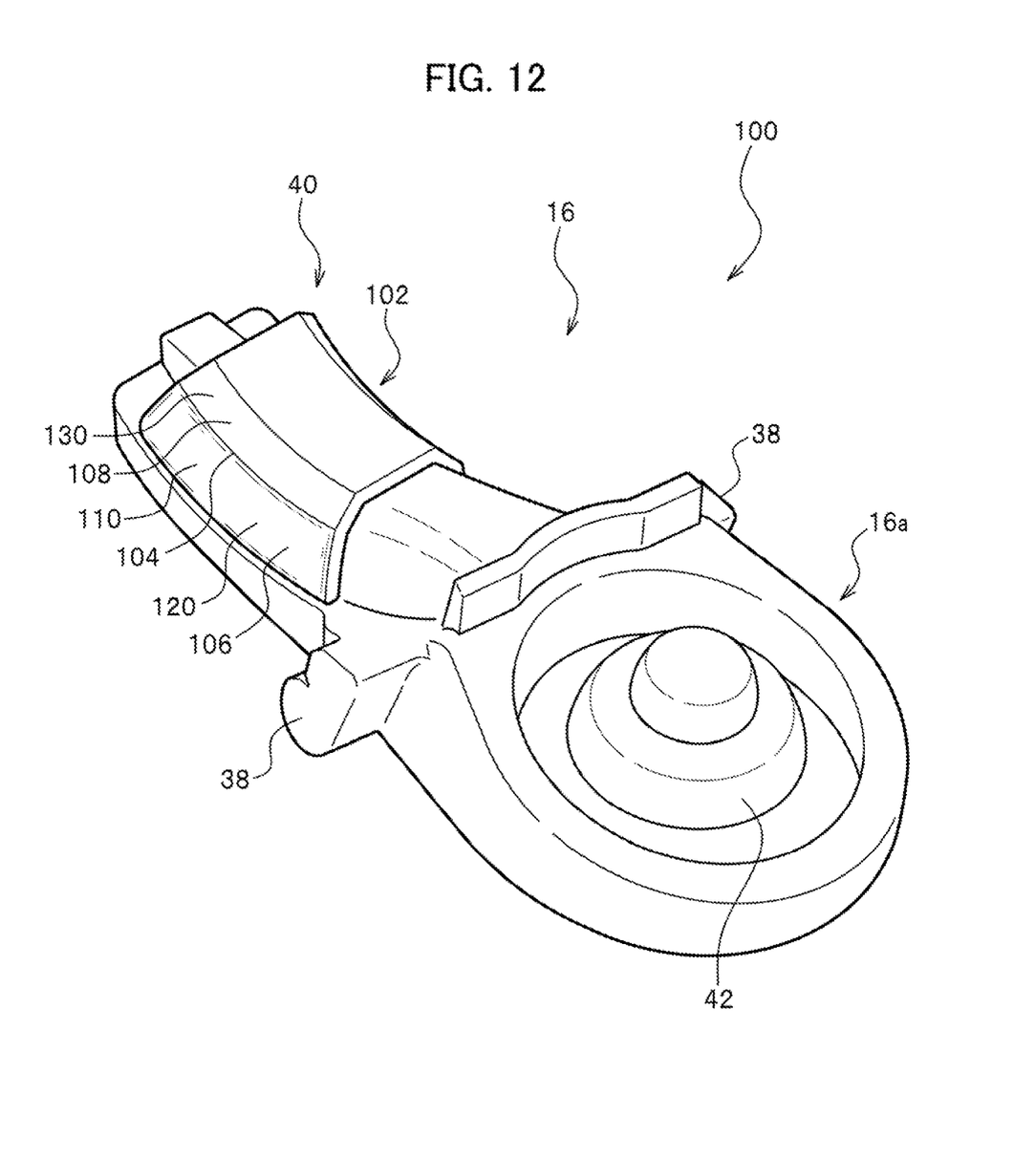
FIG. 12 is an enlarged perspective view of the friction pad constituting an accelerator pedal device for use in a vehicle according to another embodiment of the present invention.
Figure 13:
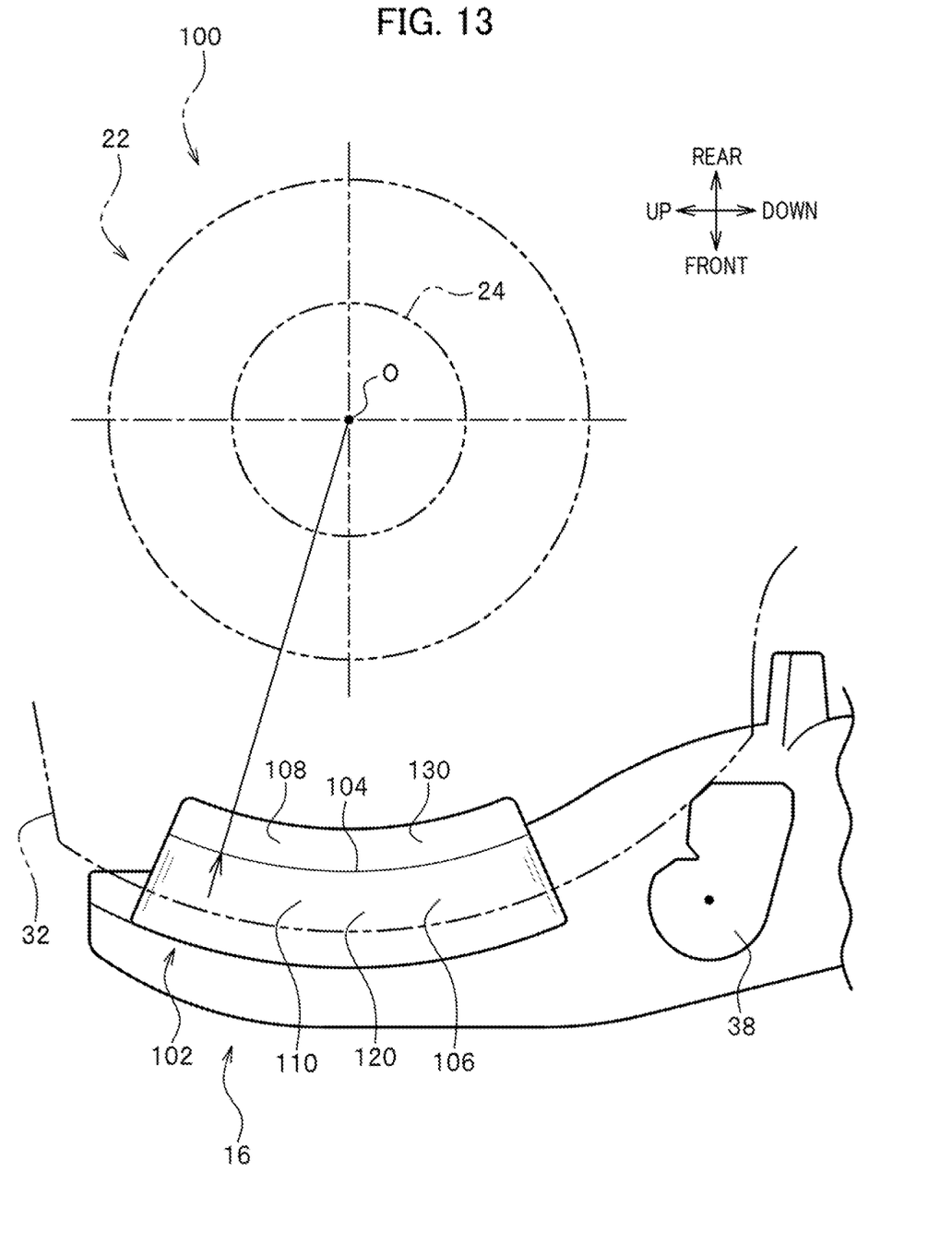
FIG. 13 is an enlarged side view showing that a ridgeline in FIG. 12 extends in an arc-shape.
Figure 14:
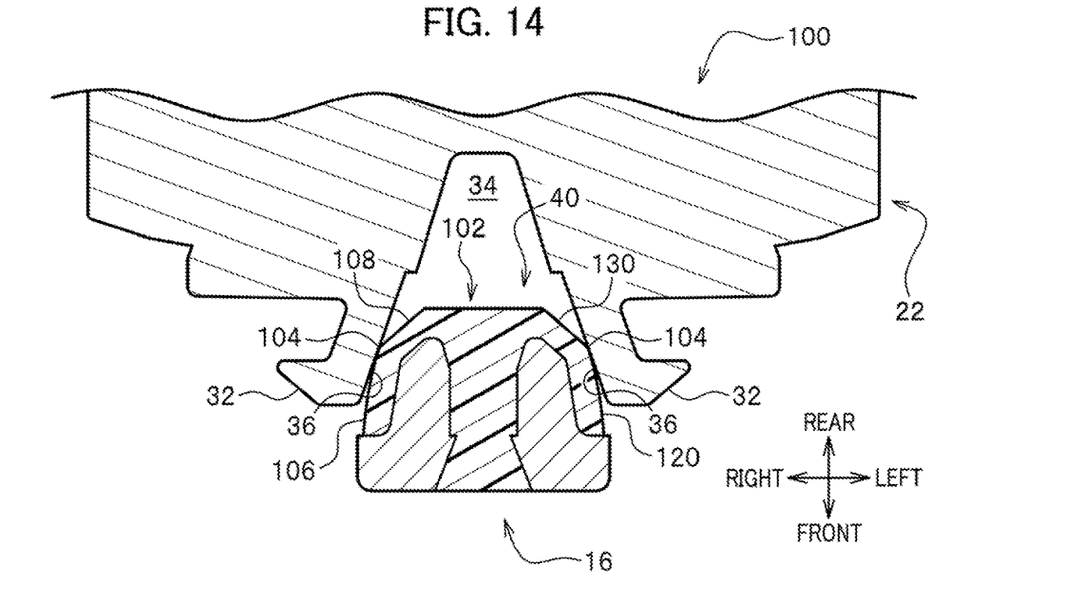
FIG. 14 is a vertical cross-sectional view of another embodiment corresponding to FIG. 4.
Figure 15:
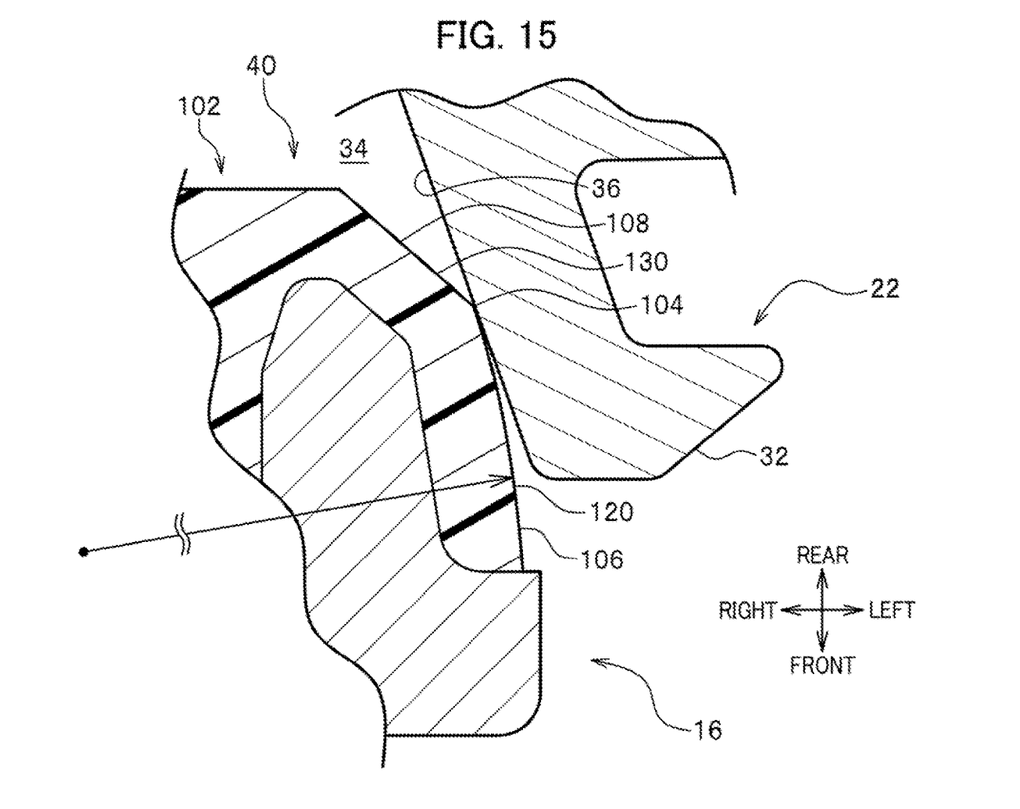
FIG. 15 is an enlarged vertical cross-sectional view of another embodiment corresponding to FIG. 5.

FIG. 12 is an enlarged perspective view of a friction pad constituting the accelerator pedal device for use in a vehicle according to another embodiment of the present invention, FIG. 13 is an enlarged side view showing that a ridgeline shown in FIG. 12 extends in an arc-shape, FIG. 14 is a vertical cross-sectional view corresponding to FIG. 4 in another embodiment, and FIG. 15 is an enlarged vertical cross-sectional view corresponding to FIG. 5 in another embodiment.

The accelerator pedal device 100 for use in a vehicle according to another embodiment differs in that, instead of the contact portion 52 of the side member 30 in the above-described embodiment, the side member 102 has a ridgeline 104 that is brought in line-contact with the recessed inner wall 36 of the drum 22. As shown in FIG. 13, the ridgeline 104 is formed in an arc-shape centered on the arm rotation shaft 24 as viewed from the axial direction of the arm rotation shaft 24.

As shown in FIG. 15, in the axial cross-section of the friction portion 40, a lower portion 106 with respect to the ridgeline 104 as a boundary is formed by an arc-shaped surface 120 having a predetermined radius of curvature. Further, an upper portion 108 with respect to the ridgeline 104 is formed by a flat surface 130 continuous with the arc-shaped surface 120. Thus, each side surface 110 of the side member 102 is formed by a complex surface of the arc-shaped surface 120 and the flat surface 130.

In another embodiment, as shown in FIGS. 14 and 15, the ridgelines 104 are formed to be brought in line-contact with the recessed inner walls 36, in which the ridgelines 104 are always brought in contact with the recessed inner walls 36 of the recessed portion 34 of the drum 22. Accordingly, the variation of contact position is prevented. As a result, in another embodiment, even if there are various variations such as dimensional errors and mounting errors, the pedal force of the accelerator arm 14 is stabilized.

As shown in FIG. 13, in another embodiment, making the ridgeline 104 in an arc-shape when viewed from the axis direction of the arm rotation shaft 24 allows the contact point on each cross section (the ridgeline 104 is a line having a plurality of contact points connected to each other) to have the same distance from the arm rotation shaft 24. In another embodiment, this prevents the increase of variations in the pedal force and increases the contact points with the recessed inner wall 36 of the drum 22. Accordingly, a surface pressure of the ridgeline 104 as a contacting portion is decreased, in addition to its durability is increased.

In another embodiment, other operational effects are the same as or substantially the same as those in the above embodiment, and a detailed description thereof will be omitted.

What is claimed is:

1. An accelerator pedal device for use in a vehicle, comprising:
   a housing fixed to a vehicle body;
   an accelerator arm that has a drum at one end and a pedal at the other end in an axial direction, and is attached to the housing so as to be pivotable between an idling position and a full throttle position;
   a friction pad that has a pad shaft and is attached to the housing so as to be pivotable about the pad shaft; and
   a spring that is interposed between the accelerator arm and the friction pad;
   wherein the drum has an arm pivoting shaft that pivotally supports the accelerator arm and a recess that is recessed from a periphery of the drum toward the arm pivoting shaft;
   the friction pad has a friction part that is pressed against the recess by a spring force of the spring;
   the friction part has a side surface member having a side surface in an arched cross section to face the recess, and the side surface member has a contact part that is brought into point-contact with the recess of the drum.

2. The accelerator pedal device for use in the vehicle according to claim 1, wherein a recessed portion is formed on a back surface of the friction part.

3. An accelerator pedal device for use in a vehicle, comprising:
   a housing fixed to a vehicle body;

an accelerator arm that has a drum at one end and a pedal at the other end in an axial direction, and is attached to the housing so as to be pivotable between an idling position and a full throttle position;
a friction pad that has a pad shaft and is attached to the housing so as to be pivotable about the pad shaft;
a spring that is interposed between the accelerator arm and the friction pad;
wherein the drum has an arm pivoting shaft that pivotally supports the accelerator arm and a recess that is recessed from a periphery of the drum toward the arm pivoting shaft;
the friction pad has a friction part that is pressed against the recess by a spring force of the spring;
the friction part has a side surface member having a side surface to face the recess,
the side surface member has a ridge part that is brought into line-contact with the recess of the drum, and
the ridge part is formed in such a manner that a ratio (R/A) between a radius R of a circle having a drum rotation shaft as its center and a distance A from the pad shaft of the friction pad to the ridge part is set to be constant.

4. The accelerator pedal device for use in the vehicle according to claim 3, wherein a recessed portion is formed on a back surface of the friction part.

\* \* \* \* \*